US008621916B2

(12) United States Patent
Kammerstetter et al.

(10) Patent No.: US 8,621,916 B2
(45) Date of Patent: Jan. 7, 2014

(54) SYSTEM AND METHOD FOR MEASURING INJECTION PROCESSES

(75) Inventors: Heribert Kammerstetter, Oberalm (AT); Rainer Metzler, Kaarst (DE); Manfred Werner, Duesseldorf (DE)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 13/516,239

(22) PCT Filed: Nov. 30, 2010

(86) PCT No.: PCT/EP2010/068470

§ 371 (c)(1), (2), (4) Date: Aug. 16, 2012

(87) PCT Pub. No.: WO2011/073024

PCT Pub. Date: Jun. 23, 2011

(65) Prior Publication Data

US 2012/0297867 A1 Nov. 29, 2012

(30) Foreign Application Priority Data

Dec. 17, 2009 (DE) ........................ 10 2009 058 932

(51) Int. Cl.
*G01M 15/04* (2006.01)

(52) U.S. Cl.
USPC ...................................................... 73/114.51

(58) Field of Classification Search
USPC ............................ 73/114.47, 114.48, 114.51
See application file for complete search history.

(56) References Cited

U.S. PATENT DOCUMENTS

| | | | | |
|---|---|---|---|---|
| 4,546,648 | A * | 10/1985 | Abt et al. | 73/114.48 |
| 6,755,076 | B1 * | 6/2004 | Schmidt et al. | 73/114.47 |
| 6,915,683 | B2 * | 7/2005 | Schoeffel et al. | 73/114.48 |
| 7,254,993 | B2 * | 8/2007 | Metzler et al. | 73/114.47 |
| 8,333,110 | B2 * | 12/2012 | Schmidt | 73/114.51 |
| 8,511,152 | B2 * | 8/2013 | Schmidt | 73/114.48 |
| 2006/0201244 | A1 | 9/2006 | Metzler et al. | |

FOREIGN PATENT DOCUMENTS

| | | | |
|---|---|---|---|
| DE | 100 64 509 | A1 | 7/2002 |
| DE | 103 31 228 | B3 | 1/2005 |
| FR | 2 795 139 | A1 | 12/2000 |
| JP | 2003-502578 | A | 1/2003 |
| JP | 2005-69128 | A | 3/2005 |
| JP | 2009-513858 | A | 4/2009 |

* cited by examiner

*Primary Examiner* — Freddie Kirkland, III
(74) *Attorney, Agent, or Firm* — Norman B. Thot

(57) ABSTRACT

A system for measuring an injection process includes a measurement chamber filled with a fluid. An injection valve injects the fluid into the measurement chamber. A piston is arranged in the measurement chamber. A sensor generates a voltage which is a measure of a piston travel. The sensor is connected with an evaluation unit which continuously detects the piston travel in the measurement chamber. A rotary displacement pump arranged in a bypass channel to the measurement chamber is driven dependent on an existing volume difference. A pressure sensor is arranged in the measurement chamber. A heating element and/or a cooling device is/are arranged at the measurement chamber and is/are actuated by a controller so that an amount of energy introduced by the fluid injected by the injection valve and an amount of energy introduced by the heating element and/or the cooling device is substantially constant for every injection.

14 Claims, 1 Drawing Sheet

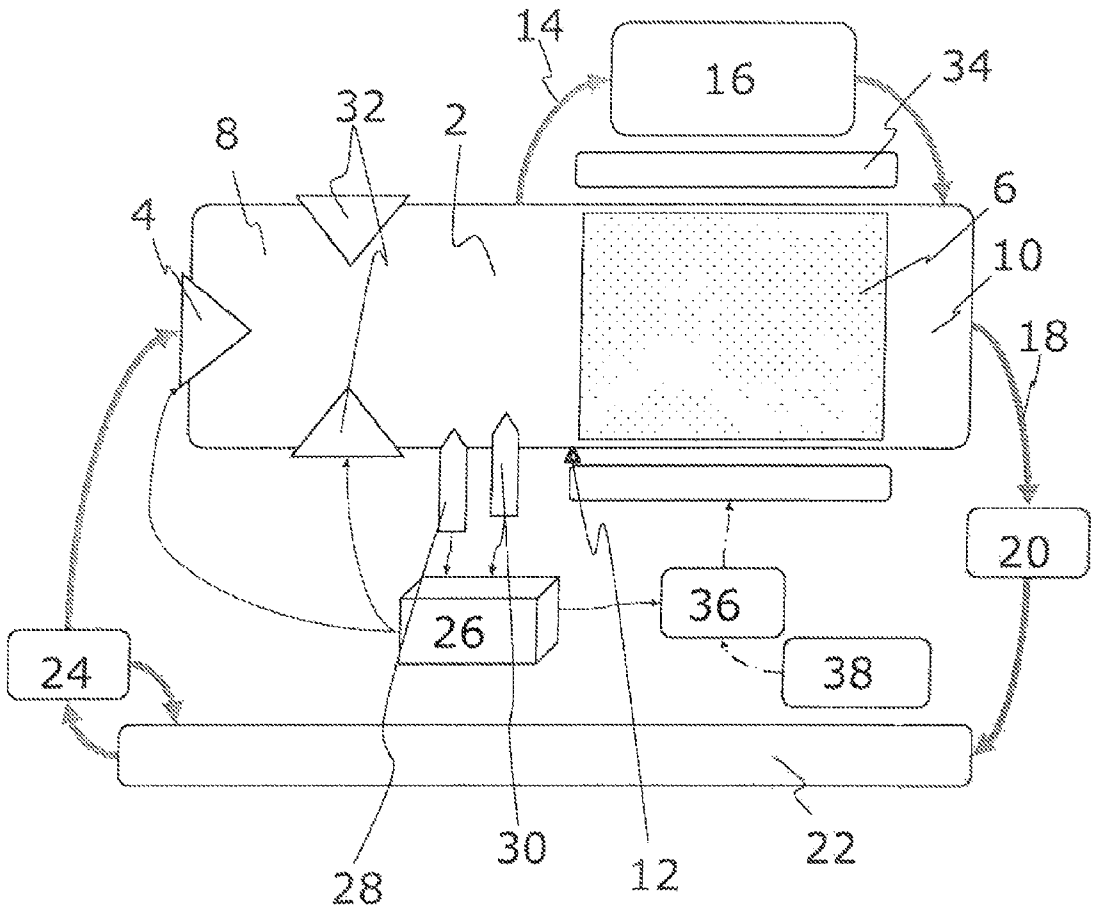
14
16
34
32
2
8
6
4
10
18
20
36
26
24
38
22
30
12
28

SYSTEM AND METHOD FOR MEASURING INJECTION PROCESSES

CROSS REFERENCE TO PRIOR APPLICATIONS

This application is a U.S. National Phase application under 35 U.S.C. §371 of International Application No. PCT/EP2010/068470, filed on Nov. 30, 2010 and which claims benefit to German Patent Application No. 10 2009 058 932.5, filed on Dec. 17, 2009. The International Application was published in German on Jun. 23, 2011 as WO 2011/073024 A1 under PCT Article 21(2).

FIELD

The present invention provides a system for measuring injection processes comprising an injection valve, a measurement chamber filled with a fluid, into which a fluid amount can be injected by means of the injection valve, a piston arranged in the measurement chamber, a sensor whose generated voltage is a measure of the travel of the piston and which is connected to an evaluation unit that continuously detects the piston travel in the measurement chamber, a rotary displacement pump driven in dependence on the prevailing volume difference and arranged in a bypass channel to the measurement chamber, and a pressure sensor arranged in the measurement chamber, as well as to a method for measuring injection processes using such a system.

BACKGROUND

Such systems are known per se and are described in various publications. Primarily in the field of direct injection combustion engines that operate according to the compression ignition or the spark ignition methods, the demands on injection systems with respect to the allocated amount, the time and the rate-of-discharge curve are ever increasing. Rate-of-discharge curves have thus been modified over the last years such that either the injection amount to be allocated to a combustion cycle is split into a plurality of partial injections, or the rate development forming is controlled through a modulation of the fuel pressure or other rate-modulating measures. In order to be able to reproduce these rate-of-discharge curves in an exact manner, if possible in real time, corresponding systems must be provided with which the injection behavior of individual fuel injectors can be reproduced as exactly as possible.

DE 103 31 228 B3 describes a device for measuring time-resolved volumetric flow processes, in particular injection processes in internal combustion engines. This device includes a rotary displacement device arranged in a bypass line and a movable piston arranged in a measurement chamber, the piston having the same specific weight as the measuring liquid. The piston has a sensor associated thereto whose generated voltage is a measure of the piston travel when injections occur. The voltage generated is supplied to an evaluation unit that continuously detects the travel of the piston in the measurement chamber and graphically represents flow processes with high temporal resolution. Control electronics provide for a control of the rotary displacement device such that the rotational speed of the rotary displacement device remains constant during a working cycle of the injection system and substantially corresponds to the mean throughflow throughout the working cycle. This device allows for a representation of flow processes with high temporal resolution so that both total amounts and exact developments can be represented and evaluated.

This device is, however, disadvantageous in that longer thermal setting times exist because of the energy input by the injection into the measurement chamber. Up to the present, attempts have been made to compensate for the measuring inaccuracies resulting therefrom by compensation constants obtained by preliminary measurements. However, inaccuracies persist since these constants are not always exactly known.

DE 100 64 509 A1 describes a method for calibrating path sensors wherein, prior to the actual measurement, a calibration table is built from quadruples of temperature, pressure and measuring signal of the path sensor. In order to allow this table to be built, an annular space can be tempered, i.e., certain temperatures can be set in the annular space. This compensation can only be performed at a high expenditure of time for calibration purposes and must be repeated for each additional valve. In addition, a new setting process takes place in the system upon every injection so that, for an overall injection formed by a plurality of individual injections, an exact measurement cannot be represented with any resolution, since no individual temperature changes can be measured.

SUMMARY

An aspect of the present invention is to provide a system and a method for measuring injection processes with which the measuring accuracy of a flow meter can be enhanced.

In an embodiment, the present invention provides a system for measuring an injection process which includes a measurement chamber filled with a fluid. An injection valve is configured to inject an amount of the fluid via an injection into the measurement chamber. A piston is arranged in the measurement chamber. A sensor is configured to generate a voltage. The voltage is a measure of a piston travel. The sensor is connected with an evaluation unit configured to continuously detect the piston travel in the measurement chamber. A rotary displacement pump is configured to be driven dependent on an existing volume difference. The rotary displacement pump is arranged in a bypass channel to the measurement chamber. A pressure sensor is arranged in the measurement chamber. At least one of a heating element and a cooling device is arranged at the measurement chamber. The at least one of the heating element and the cooling device is configured to be actuated by a controller so that an amount of energy introduced by the amount of the fluid injected by the injection valve and an amount of energy introduced by the at least one of the heating element and the cooling device is substantially constant for every injection.

BRIEF DESCRIPTION OF THE DRAWINGS

The present invention is described in greater detail below on the basis of embodiments and of the drawings in which:

FIG. 1 shows an embodiment of the system for measuring injection processes of the present invention.

DETAILED DESCRIPTION

By providing heating or cooling elements at the measurement chamber, which are actuatable by means of controller such that the amount of energy per injection introduced by the injected fluid and the cooling or heating elements is substantially constant, it is achieved that the measured and calculated injected amount no longer depends on a temperature change. The injected amounts are correspondingly determined correctly even for a plurality of successive injection processes since no setting processes exist.

These advantages are also available from a method wherein a substantially constant amount of energy is introduced into the measurement chamber per injection, which is composed of the amount of energy introduced by the injection and an amount of energy introduced by heating or cooling elements.

In an embodiment of the present invention, the heating elements can, for example, be glow plugs. These are adapted to introduce sufficient amounts of energy into the system in a very short time.

In an embodiment of the present invention, a cooling device can, for example, be arranged at the measurement chamber, via which a constant amount of heat can be dissipated from the measurement chamber. An overheating of the system is thereby excluded in the event of a continuous energy input.

In a development of the above embodiment, the coolant amount supplied to the cooling device can be controlled by means of a magnetic valve connected with the controller. This valve also switches very fast so that an accurate control becomes possible.

In an embodiment of the present invention, the measurement chamber can, for example, house a temperature sensor by means of which the correct energy input can be checked. The values determined via the temperature sensor may also serve for a further correction of the energy input or, in the event of a very fast absorption of thermal energy, they may serve as reference variables for the energy input.

When performing an advantageous method, first a maximum energy input is calculated for the maximum opening time of the injection valve, then the expected energy input by the injection is calculated or the actual energy input is measured, whereupon a differential energy between the maximum energy input and the actual energy input is calculated, and finally the differential energy is introduced into the measurement chamber via the heating elements. It is thus achieved that the energy input into the system per injection is always the same, whereby a respective constant energy increase takes place in the system, which may again be dissipated by means of the additional cooling. As such, each measurement is taken at the same temperature in the system.

In an embodiment of the present invention, an actual or expected energy input introduced by the injection is first calculated or measured; this amount of energy is then drawn from the system via a corresponding cooling. It is thereby also possible to provide a constant temperature in the system for the purpose of accurate measuring.

In an embodiment of the present invention, the energy input to be expected can, for example, be calculated using a characteristic diagram in which the energy input is plotted over the flow to be expected for certain opening times of the injection valve and over the differential pressure set. Since the controller knows the opening time and a fixed differential pressure, as well as a theoretic expected flow through the displacement pump during this opening time are known from the pressure controller and the high-pressure pump, a theoretically required energy input can be determined therefrom by means of the characteristic diagram and can be supplied to the system. The resulting differences between the theoretic flow and the flow subsequently measured in the system is generally so small that no subsequent adjustment is necessary, while such a subsequent adjustment is, of course, still possible. The measurement can thus be repeated with improved characteristic diagrams until a constant temperature prevails in the system.

In an embodiment of the present invention, the actual energy input can, for example, be determined by measuring a temperature change in the measurement chamber and the difference to the maximum energy input supplied to the system. Constant temperatures are achieved in the measurement chamber that leads to exact measuring results; however, this system is slower.

In an embodiment of the present invention, the temperature change can, for example, be measured after the introduction of the additional energy input and a correction energy input determined from the temperature change, which is supplied to or drawn from the measurement chamber. This allows providing an iteratively operating system by which differences between the flow forming the base of the energy input and the flow measured subsequently are corrected.

An embodiment of the present system is schematically illustrated in FIG. 1. The present invention will be described hereinafter with reference to FIG. 1.

The system of the present invention comprises a measurement chamber 2 at which an injection valve 4 is arranged such that the injection valve 4 can make injections into the measurement chamber 2. A piston 6 is arranged in the measurement chamber 2, which piston 6 is movable in the axial direction and has the same specific weight as the fluid in the measurement chamber 2. The piston 6 divides the measurement chamber 2 into an inlet portion 8 and an outlet portion 10. A sensor 12 is arranged at the measurement chamber 2, which detects the movement of the piston 6 in the measurement chamber 2.

In addition, a rotary displacement pump 16, for example, in the form of a gear pump, is arranged in a bypass channel 14 surrounding the piston 6 and connecting the inlet portion 8 of the measurement chamber 2 with the outlet portion 10 while bypassing the piston 6. From the outlet portion 10 of the measurement chamber 2, an outlet line 18 leads into a tank 22 via a pressure controller 20, in which tank the fluid is stored and which is connected with the injection valve 4 via a feed pump 24. The pressure controller 20 causes a fixed pressure in the outlet opening 18.

The sensor 12, as well as the injection valve 4 and the rotary displacement pump 16, is connected with a controller 26 that receives and processes the values from sensor 12 arranged at the measurement chamber 2 and the number of rotations of the rotary displacement pump 16, the rotary displacement pump 16 being provided with a movement sensor. In the measurement chamber 2, a pressure sensor 28 and a temperature sensor 30 are arranged between the piston 6 and the injection valve 4, the temperature sensor 30 and the pressure sensor 28 continuously measuring the pressures and temperatures, respectively, prevailing in this zone and supplying these to the controller 26 which simultaneously serves to control the injection valve 4 and as an evaluation unit for the detection of the piston position.

According to the present invention, heating elements 32 in the form of glow plugs are arranged at the measurement chamber 2, via which energy can quickly be input into the measurement chamber 2. For this purpose, heating elements 32 are also connected with the controller 26. A cooling device 34 is further arranged in the vicinity of the piston 6, via which energy can be drawn from the measurement chamber 2. The control is effected by means of a magnet valve 36 via which a conditioned cooling medium can be supplied to the cooling device 34 from a reservoir 38.

When the test fluid is injected from the injection valve 4 into the measurement chamber 2, the piston 6 reacts without delay. The rotary displacement pump 16 arranged in the bypass channel 14 is at the same time driven at a rotational speed that is a function of the travel of the piston 6 and, thus, of the fluid amount injected. The pump speed is controlled in a manner known per se such that the rotational speed of the rotary displacement pump 16 and, thus, the flow are kept constant for a working cycle.

The travel of the piston 6 thus occurs due to a superposition of a continuous part provided by the rotary displacement pump 16 with a discontinuous part occurring during an injection process that is directed oppositely. Using the pressure sensor 28 arranged in the measurement chamber 2, the controller 26 converts the signal from the pressure sensor 28 into an injected amount of fluid over time. For this purpose, the continuous part of the movement caused by the rotary displacement pump 16 is subtracted from the path actually traveled, i.e., the values from the sensor 12. The conversion in the controller 26 is effected using a physically-based model calculation, in which the actually-measured piston travel is converted (using the pressure signal) into a piston travel that would be obtained under isobaric conditions during measurement. This calculation accordingly also reflects the compressibility modulus of the fluid as a function of the pressure.

Due to the energy input by the injection, however, the temperature of the fluid changes as well. A compensation by measuring the temperature development and a calculation using compensation constants often remains fraught with errors. Heating elements 32 are therefore used to introduce additional energy into the measurement chamber 2. The energy amount is determined such that the temperature in the measurement chamber 2 remains constant regardless of the injection time.

For this purpose, the characteristics of the injection valve 4 are first used to calculate a maximum energy amount to be introduced into the measurement chamber 2 by injection. Correspondingly, the actual energy input into the measurement chamber 2 will generally be smaller than this amount of energy. The difference between the maximum calculated amount of energy and the amount of energy introduced by injection is supplied to the measurement chamber upon each injection via the heating elements 32. At the same time, a defined amount of energy is drawn off via the cooling device 34 in order to keep up the temperature in the measurement chamber 2. Accordingly, no temperature compensation must be made when calculating the injected amount of fluid. No errors are caused by the fact that the compressibility is modified by changes in temperature.

The amount of energy to be supplied via the heating elements 32 is controlled, for example, by means of a characteristic diagram stored in the controller 26, in which the energy input is plotted over the flow through the rotary displacement pump 16 and the differential pressure defined via the pressure controller. Here, the flow depends on the opening time set and the differential pressure. This amount of energy is thus calculated using the characteristic diagram and is supplied into the measurement chamber 2 via the heating elements 32 during a measuring cycle. Since this control does not give consideration to the dissipation of energy by the discharge of the medium itself, the temperature sensor 30 may be used for correction or for a plausibility check, where the temperature sensor 30 should therefore measure a temperature that is constant at the beginning and at the end of the cycle. If the same is not constant, there is an error in the stored characteristic diagram which can be adjusted accordingly.

As an alternative, the determination of the amount of energy to be introduced may be effected only via the temperature sensor 30. In this case, however, the system would be a fully lagging system with longer setting times.

It is correspondingly possible both to perform an adjustment of the characteristic diagram until a constant temperature prevails and to conclude on malfunctions of the injection valve in the absence of constancy.

A precise measuring follows which can be performed fast and under isobaric conditions, therefore requiring no additional temperature-dependent compressibility constants.

It should be clear that an energy balance can also be obtained only by cooling, which must be done very fast, however, and that the temperature can thus be kept constant. Further possibilities for the determination of the energy portion to be introduced or withdrawn are conceivable. Structural modifications are also conceivable within the scope of the present invention.

The present invention is not limited to embodiments described herein; reference should be had to the appended claims.

What is claimed is:

1. A system for measuring an injection process, the system comprising:

a measurement chamber filled with a fluid;

an injection valve configured to inject an amount of the fluid via an injection into the measurement chamber;

a piston arranged in the measurement chamber;

a sensor configured to generate a voltage, the voltage being a measure of a piston travel, the sensor being connected with an evaluation unit configured to continuously detect the piston travel in the measurement chamber;

a rotary displacement pump configured to be driven dependent on an existing volume difference, the rotary displacement pump being arranged in a bypass channel to the measurement chamber;

a pressure sensor arranged in the measurement chamber; and at least one of a heating element and a cooling device arranged at the measurement chamber, the at least one of the heating element and the cooling device being configured to be actuated by a controller so that an amount of energy introduced by the amount of the fluid injected by the injection valve and an amount of energy introduced by the at least one of the heating element and the cooling device is substantially constant for every injection.

2. The system as recited in claim 1, wherein the heating element is a glow plug.

3. The system as recited in claim 1, wherein the cooling device is configured to dissipate a constant amount of heat from the measurement chamber.

4. The system as recited in claim 3, wherein an amount of coolant is supplied to the cooling device, and further comprising a magnet valve connected with the controller, the magnet valve being configured to control the amount of the coolant supplied to the cooling device.

5. The system as recited in claim 1, further comprising a temperature sensor arranged in the measurement chamber.

6. A method for measuring an injection process with the system recited in claim 1, the method comprising:

providing the system as recited in claim 1; and introducing a substantially constant amount of energy into the measurement chamber for every injection, wherein the substantially constant amount of energy is effected by introducing an amount of energy via the injection and either introducing an amount of energy via the heating element or by withdrawing an amount of energy via the cooling device.

7. The method as recited in claim 6, further comprising:

calculating a maximum energy input for a maximum opening time of the injection valve;

calculating an expected energy input of the injection or measuring an actual energy input of the injection;

calculating an energy difference between the maximum energy input and the expected energy input or the actual energy input; and introducing the energy difference calculated into the measurement chamber via the heating element.

8. The method as recited in claim 7, wherein the expected energy input is calculated using a characteristic diagram in which an energy input is plotted over an expected flow for certain opening times of the injection valve and a differential pressure set.

9. The method as recited in claim 7, wherein the actual energy input is calculated by measuring a change in temperature in the measurement chamber.

10. The method as recited in claim 9, further comprising:

measuring the change in temperature after an introduction of an additional energy input;

determining a correction energy input from the change in temperature; and supplying the correction energy input determined to or withdrawing the correction energy input determined from the measurement chamber.

11. The method as recited in claim 6, further comprising:

calculating an expected energy input of the injection or measuring an actual energy input of the injection;

withdrawing the expected energy input calculated or the actual energy input calculated from the measurement chamber via the cooling device.

12. The method as recited in claim 11, wherein the expected energy input is calculated using a characteristic diagram in which an energy input is plotted over an expected flow for certain opening times of the injection valve and a differential pressure set.

13. The method as recited in claim 12, wherein the actual energy input is calculated by measuring a change in temperature in the measurement chamber.

14. The method as recited in claim 13, further comprising:

measuring the change in temperature after an introduction of an additional energy input;

determining a correction energy input from the change in temperature; and supplying the correction energy input determined to or withdrawing the correction energy input determined from the measurement chamber.

* * * * *